Jan. 15, 1963  G. K. WHITHAM ET AL  3,073,767
REACTOR FUEL ELEMENTS TESTING CONTAINER
Filed June 8, 1959
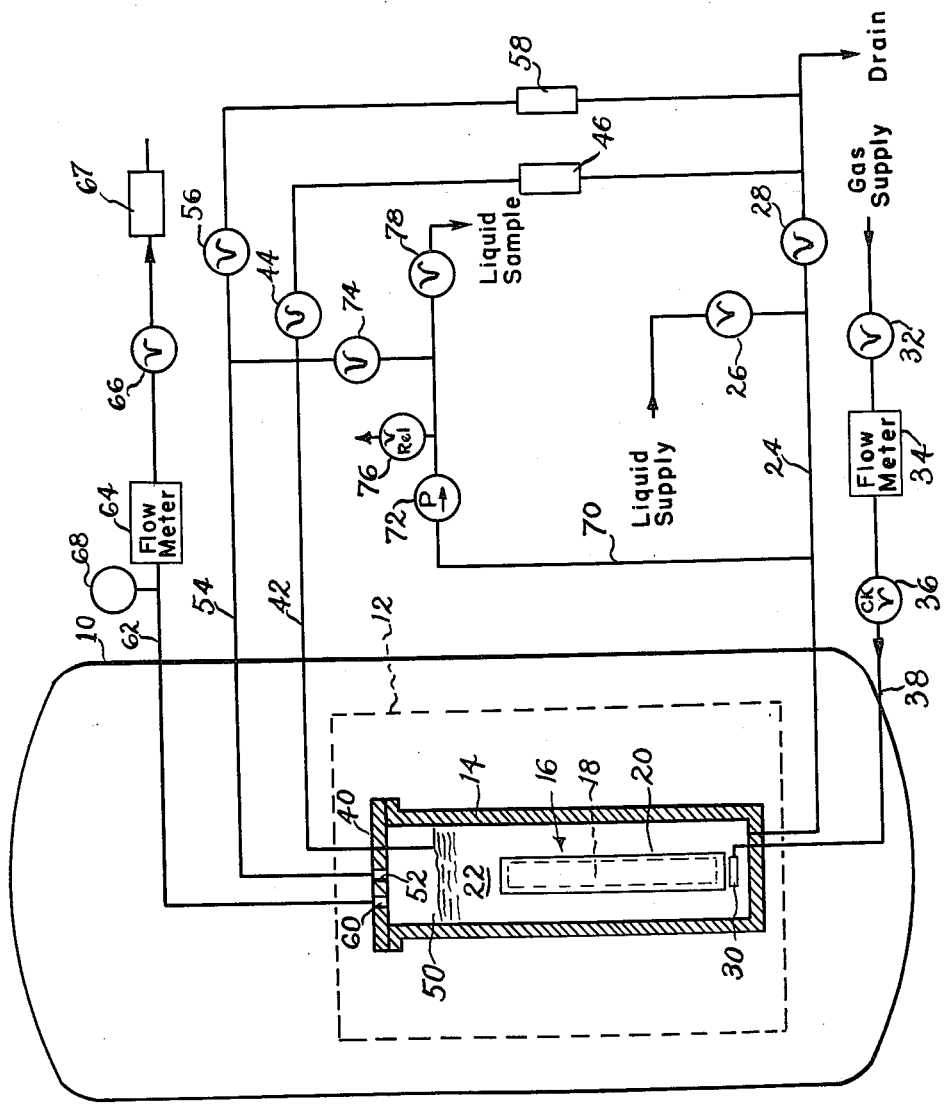
INVENTORS
George Kirby Whitham
Richard R. Smith
BY United States Patent Office 3,073,767
Patented Jan. 15, 1963

3,073,767
REACTOR FUEL ELEMENTS TESTING
CONTAINER
George Kirby Whitham and Richard R. Smith, Idaho Falls, Idaho, assignors to the United States of America as represented by the United States Atomic Energy Commission
Filed June 8, 1959, Ser. No. 818,984
5 Claims. (Cl. 204—154.2)

This invention relates to nondestructive testing of materials. More particularly this invention relates to the testing of the integrity of the jackets enclosing neutron-fissionable material.

Neutron-fissionable materials, such as uranium and plutonium, are well known to be highly corrosive when subjected to the elements contained in air, water, and other coolant materials. If the neutron-fissionable material is to be used in applications where it is subjected to such cooling mediums, as in nuclear reactors, it is required that the fissionable material be enclosed and sealed in a low-neutron-absorption protective material. Perforations, however slight, which would subject the fissionable material to the corrosive effects of the coolant medium must be prevented. It is therefore necessary that the integrity of the jacket enclosing the neutron-fissionable material be adequately tested before and during use in the desired application.

Ordinarily the samples, such as nuclear reactor fuel elements, are tested for perforations by maintaining them for a long period of time in water at a temperature approximately that of the intended operation temperature or higher. The samples are retained in the hot water for as long as two weeks, during which visual observations indicate the presence of any breaks in the jacket. Discolorations and blisters as well as other blemishes will disclose a perforation in the jacket.

As a result of this method of testing a sample which is faulty is usually ruined in the test beyond repair and must be discarded. Also, because of the extended duration of the tests, it is necessary to test a number of fuel elements at the same time, therefore requiring very large, expensive pressure vessels to accommodate them. The conventional testing method is quite costly both in time and money and consequently, detracts from the economic utilization of neutron-fissionable materials.

It is therefore an object of this invention to provide an economical and time-saving method and means for determining the integrity of a jacket enclosing a fissionable fuel material.

It is also an object of this invention to provide method and means for determining the integrity of a jacket enclosing a fissionable fuel material which will not result in the destruction of the sample being tested.

Other objects and advantages will become readily apparent to one skilled in the art upon further reading of this specification.

This invention provides a method and means for accomplishing the objects and advantages hereinbefore stated in which the jacketed fissionable fuel is immersed in a low-neutron absorption liquid in a partially filled, sealed tank which is subected to a neutron flux. A suitable, low-neutron-absorbing gas is sparged through the liquid and is monitored for radioactivity. The presence of radioactivity of a predetermined nature will indicate the presence of fission fragments in the gas which have leaked through perforations in the jacket.

The invention may be understood from the description in connection with the accompanying drawing which is a single FIGURE showing diagrammatically the testing system.

In the drawing is shown a thermal-neutron-fissionable-nuclear reactor 10 having an active portion 12. The nuclear reactor 10 is preferably water moderated although it is understood that a thermal-neutron reactor using any type of moderator may be adapted for use in the testing system of the invention. It is to be further understood that any source of thermal neutrons may be used to irradiate the sample being tested.

A sealed tank 14 preferably of a low-neutron-absorbent material is disposed within the neutron flux in the active portion 12 of the reactor 10. The tank 14 is sufficiently large to enclose one or more samples 16 to be tested. The system of the invention was developed primarily for the testing of nuclear reactor fuel elements. However, it is to be understood that any type of sample 16 which is comprised of a fissionable fuel material body 18 enclosed in a corrosion protective jacket 20 may be tested by the method and means of this invention.

The tank 14 is partially filled with a liquid 22 submerging the sample 16 therein during the operation of the test. The liquid comprises a low neutron absorbing element and is preferably an efficient neutron moderator material such as water. The liquid 22 is introduced into the tank 14 through pipe means 24 which connect it through valve 26 to the liquid supply. The pipe means 24 also connect the tank 14 through valve 28 to a drain for emptying the liquid from the tank 14 when desired.

During operation of the test a suitable gas is sparged through the liquid 22 in the tank 14 by means of a sparging nozzle 30 connected to a gas supply through a gas throttling valve 32, gas flow meter 34, check valve 36 and gas pipe means 38. The sparging gas is preferably a low neutron absorption material such as air or nitrogen.

A lower vent 40, extends through the top of the tank 14 and terminates at a predetermined level below the top of said tank. It is connected through suitable pipe means 42, valve 44, and a transparent pipe section 46 to the drain. The level of the bottom end of the lower vent 40 assures the proper volume of gas space 50 between the liquid 22 and the top of the tank 14 as hereinafter described. An upper vent 52 terminates at the top of the tank 14, and is connected through suitable pipe means 54, valve 56, and a transparent pipe section 58 to the drain. The purpose of the upper vent 52 will be hereinafter described.

A gas outlet 60 is provided through the top of the tank 14 from which the sparging gas is taken through gas pipe means 62, flow meter 64, and valve 66 to a suitable gas radiation detector 67 such as an ion chamber, proportion counter or Geiger-Müller counter, which will monitor the effluent gas for the presence of radioactivity. A pressure gauge 68 is connected to the gas pipe means 62 between the tank 14 and the flow meter 64 to indicate the pressure in the tank.

*Operation of the Gas Test*

At the outset of the procedure, the reactor must be shut down and all of the valves must be closed. The sample 16 is placed into the test tank 14 in the active portion of the reactor. Any contaminated liquid which is in the test container 14 must be removed. To do so, the drain valve 28 and the gas throttling valve 32 are opened. The gas will force the liquid out of the test container 14 to the drain and the pressure gauge 68 will show a sudden pressure drop when the container is empty at which time the valves 28 and 32 are closed.

To fill the tank 14 with uncontaminated deionized liquid, the valve 44 and valve 26 are opened. When the tank 14 is filled liquid will flow through the lower vent 40, pipe means 42, valve 44 and transparent pipe section 46 to the drain. Liquid passing through the transparent pipe section 46 gives a visual indication when the test chamber 14 is filled. The liquid supply valve 26 is then closed.

The gas throttling valve 32 is then opened and the gas entering the tank 14 forces the liquid level down to the level of the bottom end of the lower vent 40 to provide the gas space 50 within the tank 14. When the proper gas volume in the test container is obtained, the transparent pipe section 46 will show gas and foam passing to the drain at which time valves 32 and 44 may be closed.

The reactor 10 may then be operated, subjecting the sample 16 within the tank 14 to a neutron flux. Some of the neutrons will be captured by the nuclei of the fissionable material 18 causing some of them to fission. In the fissioning reaction, the nuclei break up into fission fragments along with the release of additional neutrons. For example, uranium 235 in fissioning will split to form light fission fragments such as bromine, krypton, rubidium, strontium, yttrium, etc., and into heavy fission fragments such as antimony, tellurium, iodine, xenon, cesium, barium, etc. Some of these fission fragments are radioactive and are useful to the process as hereinafter described.

As the reactor is operating the gas throttle valve 32 and the valve 66 to the air supply are opened. Very small bubbles are formed by the gas emanating from the sparging nozzle 30 which pass upward past the sample 16. If there are any leaks in the jacket 20 enclosing the fissionable material 18 in the sample 16, some of the fission fragments will pass therethrough and be absorbed in the bubbles of gas. The liquid is removed from the gas in the space 50 and the gas passes through the gas outlet 60 through the flow meter 64 and valve 66 to the gas radiation detector 67.

The radiation detector 67 will indicate the presence of radioactive products absorbed in the gas. Since the radioactive decay properties of the fission fragments are well-known, their presence in the effluent gas will be readily recognized and will indicate the leaks in the sample being tested. Readings on the detector 67 should be taken at predetermined intervals over a period of time to be sure of the responsiveness of the test.

At the conclusion of the test, the valves 32 and 66 are closed and the reactor 10 is shut down.

To remove the sample 16 from the tank 14, the valve 56 connecting the upper vent 52 to the drain is opened and the liquid supply valve 26 is also opened to circulate liquid through the tank. When water appears at the transparent part section 58, the valve 56 is throttled until the pressure gauge 68 reads approximately 8 lbs. per sq. inch. The valves 26 and 56 are then secured to hold the pressure. This will assure a positive pressure with no trapped gas in the container at the time of opening.

As a note of caution it is pointed out that filling the test container 14, with gas and subsequently substituting the gas with deionized liquid may cause marked reactivity fluctuations in the nuclear reactor. Therefore, the rate that the liquid be added should be limited to a slow flow rate. The reactor operator should also be cognizant of the critical position on the previous run so that any irregularities in critical position are noticed immediately.

Nuclear reactor fuel elements have been tested by the inventor in a reactor of the type disclosed in "Proceedings of the International Conference on the Peaceful Uses of Atomic Energy," volume III, United Nations 1955, pages 56–78. A test tank was fabricated of aluminum and stainless steel to fit within the space occupied by four fuel elements in one quadrant of the reactor. A number of uranium-oxide-containing aluminum jacketed fuel elements were tested with results as shown in the table below. Deionized water was used in the test procedures and nitrogen was used as the sparging gas. The reactor was operated at between 10 and 20 kilowatts from 10 to 30 minutes while the gas was bubbled through the fuel elements under test at approximately 10 cubic feet per hour. The effluent gas was monitored by a Berkeley Geiger counter and a Jordan ionization chamber. The table below shows the readings of each detector for four fuel elements tested; the first two of which had no leaks and the other two of which were confirmed to have leaks by physically stripping the jackets from them.

SAMPLE 1

| Time | Berkeley, mr./hr. | Jordan, mr./hr. | Bkgd. Tracer, mr./hr. |
|---|---|---|---|
| 0 | .6 | .5 | .36 |
| 2 | .8 | .5 | .39 |
| 4 | 1.2 | .5 | .35 |
| 6 | 1.5 | .5 | .4 |
| 8 | 1.8 | .5 | .40 |
| 10 | 3.0 | .5 | .40 |
| 12 | 1.8 | .5 | .40 |
| 14 | 1.9 | .5 | .42 |
| 16 | 2.8 | .5 | .40 |
| 18 | 2.8 | .5 | .40 |

SAMPLE 2

| | | | |
|---|---|---|---|
| 0 | .7 | .5 | .4 |
| 2 | .9 | .5 | .45 |
| 4 | .9 | .5 | .50 |
| 6 | 1.1 | .5 | .55 |
| 8 | 1.3 | .5 | .60 |
| 10 | 1.3 | .5 | .60 |
| 12 | 1.3 | .5 | .60 |
| 14 | 1.5 | .5 | .68 |
| 16 | 1.5 | .5 | .80 |

SAMPLE 3

| | | | |
|---|---|---|---|
| 0 | 3.0 | .5 | .35 |
| 1 | 2.9 | .5 | .40 |
| 2 | 17.5 | 3.7 | .42 |
| 3 | Off scale | 13.0 | .56 |
| 4 | Off scale | 21.0 | .70 |

SAMPLE 4

| | | | |
|---|---|---|---|
| 0 | 4.0 | .5 | .6 |
| 1 | 4.2 | .5 | .6 |
| 2 | 9 | 1.3 | .66 |
| 3 | 16.5 | 2.4 | .7 |
| 4 | | 13 | .8 |
| 5 | | 31 | 1.1 |

Apparatus is disclosed in the figure to be used in a water sampling test which may be made to verify the results of the gas test if desired. This includes a pipe means 70 connecting the input of a circulating pump 72 to the pipe means 24 between the tank 14 and the drain valve 28. The outlet of the pump 72 is connected through valve means 74 to the pipe means 54 leading from the upper vent 52. A relief valve 76 is also connected to the outlet of the pump 72 as well as a manual valve 78 which may be used to take samples of the liquid as desired.

To take a water sample the following procedure is followed: The tank 14 is first drained by opening the drain valve 28 and the gas supply valve 32. When the tank is empty, the valves 28 and 32 are closed. The tank 14 is then filled with decontaminated deionized liquid by opening the top vent valve 56 and the liquid supply valve 26 until the transparent pipe section 58 indicates that the tank is full and liquid is passing to the drain at which time the valves 26 and 56 are closed. The reactor is then started, the recirculating valve 74 is opened, and the pump 72 is turned on. After approximately 10 minutes, the reactor is scrammed and the pump 72 continues to operate. At a predetermined time after the reactor is scrammed a sample of the circulating liquid through the valve 78 is obtained and is chemically processed for the presence of cesium 138 which would verify the presence of a leak in the jacket of the test sample.

It is intended that this invention should not be limited to the details of the apparatus and methods set forth

What is claimed is:

1. A method for determining the integrity of a jacket enclosing a neutron-fissionable fuel element, comprising placing the jacketed fuel element in a sealed tank within the active portion of a nuclear reactor, partially filling said tank with a liquid having a low neutron absorption cross-section so as to immerse the fuel element, operating the reactor, sparging the liquid within the tank with a nonradioactive gas having a low neutron absorption cross-section while operating the reactor and monitoring the effluent gas for the presence of entrained radioactive fission product gas.

2. A method for determining the integrity of a jacket enclosing a neutron-fissionable fuel element, comprising placing the jacketed fuel element in a sealed tank within the active portion of a nuclear reactor, partially filling the tank with a liquid of low neutron absorption cross-section so as to immerse the fuel element; then simultaneously, operating the reactor, passing a stream of small bubbles of a nonradioactive sparging gas of low neutron absorption cross-section through the liquid upward and around the jacketed fuel element, and monitoring the effluent gas for the presence of entrained radioactive fission product gas.

3. A method for determining the integrity of a jacket enclosing a uranium-containing nuclear reactor fuel element comprising: placing the jacketed fuel element in a sealed tank within the active portion of a water-moderated nuclear reactor, partially filling said tank and immersing said fuel element with water, operating the reactor, sparging the water within the tank with air while operating the reactor and monitoring the effluent air for the presence of radioactive gas selected from the group consisting of xenon and krypton.

4. Apparatus for determining the integrity of the jacket of a neutron-fissionable fuel element, comprising a nuclear reactor, a tank within the active portion of the reactor and fluid-tightly sealed therefrom, means for admitting liquid to the tank to a sufficient level to immerse the fuel element, means for admitting a nonradioactive sparging gas adjacent the bottom of the tank, means above the level of the liquid for withdrawing gas from the tank to a point outside the reactor, and means for monitoring the withdrawn gas for entrained radioactive fission product gas.

5. The apparatus of claim 4 where the means for admitting the sparging gas is a nozzle adapted to emit small bubbles, said nozzle being located in the center, and adjacent the bottom of the tank.

References Cited in the file of this patent

UNITED STATES PATENTS

| 2,796,398 | Creutz | June 18, 1957 |
| 2,806,819 | Christy et al. | Sept. 17, 1957 |

FOREIGN PATENTS

| 793,905 | Great Britain | Apr. 23, 1958 |
| 1,039,145 | Germany | Sept. 18, 1958 |

OTHER REFERENCES

Robinson, "Nuclear Science and Engr.: 4," p. 270 (1958).